US005935689A

United States Patent [19]

Foley et al.

[11] Patent Number: 5,935,689

[45] Date of Patent: Aug. 10, 1999

[54] METHOD OF PRINTING AND PRINTING MEDIUM

[75] Inventors: Diane M. Foley, Palmyra; David H. Rockwood, Fairport, both of N.Y.

[73] Assignee: Xerox Corporation, Stamford, Conn.

[21] Appl. No.: 08/841,371

[22] Filed: Apr. 30, 1997

[51] Int. Cl.[6] .......... B32B 3/00

[52] U.S. Cl. .......... 428/195; 428/211; 428/220; 428/537.5

[58] Field of Search .......... 428/537.5, 195, 428/207, 211, 220

[56] References Cited

U.S. PATENT DOCUMENTS

| | | | |
|---|---|---|---|
| 3,884,685 | 5/1975 | Green, Jr. et al. . | |
| 4,737,433 | 4/1988 | Rimai et al. . | |
| 5,171,627 | 12/1992 | Brockington et al. | 428/220 |
| 5,281,507 | 1/1994 | Simms et al. . | |
| 5,288,690 | 2/1994 | Warner et al. | 503/227 |
| 5,328,749 | 7/1994 | Noda et al. . | |
| 5,589,259 | 12/1996 | Hosoi et al. | 428/323 |
| 5,622,995 | 4/1997 | Sakurai et al. | 428/304.4 |

FOREIGN PATENT DOCUMENTS

| | | |
|---|---|---|
| A-0551893 | 7/1993 | European Pat. Off. . |
| A-2-264100 | 10/1990 | Japan . |

OTHER PUBLICATIONS

Hansuebsai, A. and D.J. Morantz. "Smoothness: Assessing Various Paper–Surface Characteristics can be Helpful in Predicting ink Transfer and Printability," *American Ink Maker,* pp. 28, 30, 32, 34–34H (1988).

Oliver J.F. "The Role of Paper Surface Properties in Non–Impact Printing," *Journal of Imaging Technology,* vol. 14, No. 5 (Oct. 1988), pp. 144–148.

Davidson, H.W. "Papieroberfläche und Bedruckbarkeit im Zuammenhang mit Molekül–und Zellstrukturen," *Das Papier,* vol. 40 No. 7 (1986), pp. 334–338.

Casey, James P., Editor. *Pulp and Paper Chemistry and Chemical Technology,* Third Edition, vol. 1, New York, (1980).

Smook G.A. *Handbook for Pulp & Paper Technologists,* Canadian Pulp and Paper Association, Montreal, Canada (1989).

Kajanto, Isko M. "The Effect of Formation on Print Quality with Woodfree Offset Papers," *Nordic Pulp and Paper Research Journal,* No. 1, (1989), pp. 8–15.

*TAPPI Test Methods.* TAPPI Press, Atlanta, GA (1996).

"T555 pm–94: Roughness of Paper and Paperboard (Print–Surf Method)," TAPPI Press (1993), pp. 1–5.

"T538 om–96: Roughness of Paper and Paperboard (Sheffield Method)," TAPPI Press (1996), pp. 1–5.

Instruction Manual for the Monroe Electronics Static Charge Analyzer Model 276A and Block Diagram.

Domtar Fine Papers, Advertising Department. *Papermaking,* Montreal, Canada.

*Primary Examiner*—Elizabeth Evans
*Attorney, Agent, or Firm*—Oliff & Berridge, PLC

[57] ABSTRACT

A method of printing and a printing medium containing a base paper and having a smoothness of less than or equal to about 110 Hagerty units, a formation index of at least about 40 and a caliper and charge acceptance sufficient to minimize or substantially or totally eliminate mottle.

22 Claims, 1 Drawing Sheet

METHOD OF PRINTING AND PRINTING MEDIUM

BACKGROUND OF THE INVENTION

1. Field of Invention

The present invention is directed to a printing method and a printing medium wherein the printed area thereof is essentially or totally free of mottle. More particularly, the present invention is directed to a color printing method and a paper medium, which is substantially or totally resistant to mottle formation in a color printed region thereof or wherein mottle is minimized.

2. Description of Related Art

Mottle is a condition relating to a printed region, usually on paper. Typically the printed region is a continuously colored area having deposited thereon one or more colors. For example, color prints (e.g., those made by xerographic printing) contain numerous such contiguously colored areas forming the print itself. Typically, mottle displays itself as a variation of color density in the printed field. For example, when viewed by the naked eye, mottle manifests itself as areas of light and heavy color density. Thus, instead of viewing uniform color density, a variation in the color density is noticed. As a result, such mottle detracts from the overall print quality.

Mottle is typically observed in color printing. When the printing color is monotone black, the presence of mottling, though present, can be overcome by masking the underlying mottle with extra layers of black ink. However, in color printing, it is often difficult to simply increase the color layer thickness. This is partly true because in color xerography, for example, it is not effective to increase the color thickness and yet maintain a given suitable color density.

Among other properties, color density, color saturation and color gamut depend on a precisely defined set of cyan, magenta, yellow and black color densities. Further, fusing energy, toner adhesion and image gloss depend on the amount of a given color toner deposited per unit area printed. As such, if the thickness of the color layer is increased to a level sufficient to mask, reduce or otherwise eliminate mottle, the desired color saturation, the color gamut, the color itself, the image gloss and the like, respectively, cannot be maintained. Thus, a need exists for providing a method of printing and a print medium that is substantially or totally resistant to mottle formation without having to increase color thickness.

SUMMARY OF THE INVENTION

The present invention provides a method of printing and a printing medium that exhibits minimized, substantially reduced or no mottle when printed upon by one or more colors. The present invention also provides a method of color xerographic printing, digital printing and digital imaging and a color xerographic or digital printing medium that minimizes or is substantially or totally resistant to mottle formation.

The present invention is accomplished by a printing medium having a printed region comprising a base wherein said printing medium has a printing surface smoothness, a formation index, FI, a thickness, r, and a charge acceptance, V, each of which is sufficient to minimize or substantially or totally eliminate mottle.

The printing is accomplished by a method of printing comprising:

(a) providing a printing medium; and (b) depositing one or more colors on the printing medium to form a printed region, wherein said printing medium has a printing surface smoothness, a formation index, FI, a thickness, r, and a charge acceptance, V, each of which is sufficient to minimize or substantially or totally eliminate mottle.

DETAILED DESCRIPTION OF PREFERRED EMBODIMENTS

Figure 1:
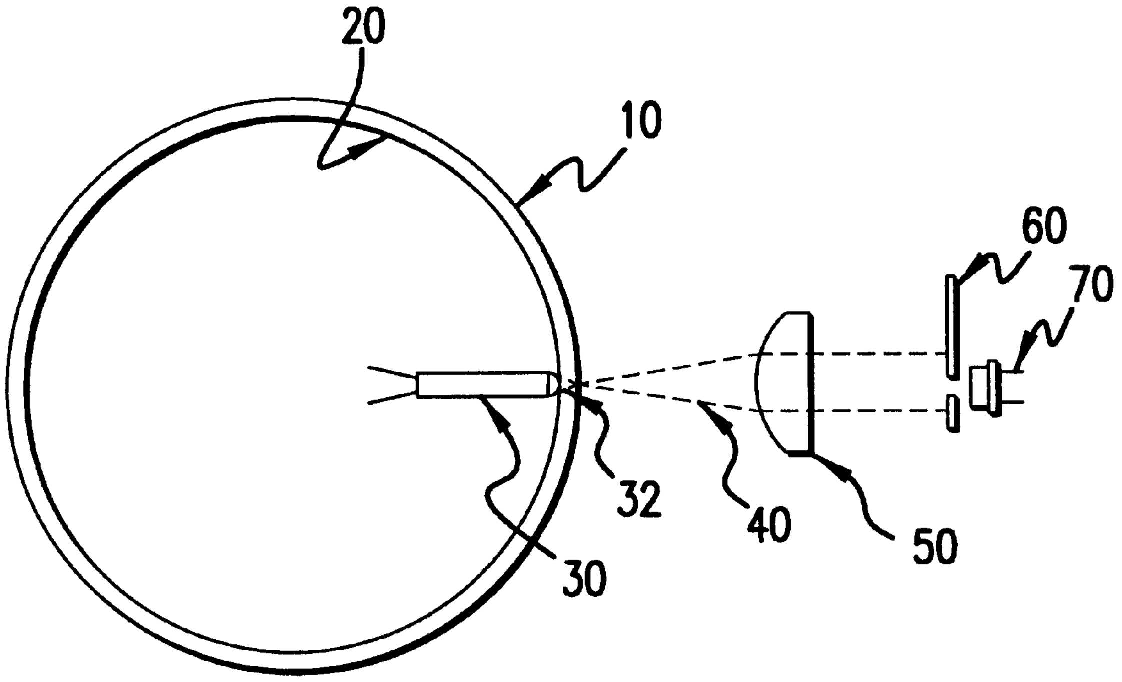
FIG. 1 is a schematic of an M/K Model 950R Formation/Floc Analyzer showing the critical parts thereof.

Several factors affect mottle formation. These factors relate to the printing medium as opposed to the pigment, ink or toner layer(s) of a print. However, unless the proper pigment, ink or toner layer combinations are used, the desired print cannot be formed. Nevertheless, until now, the mottle problem remained unsolved, in part because increased color layer thickness could not be used to overcome this problem.

Now, it is surprisingly determined that if certain printing medium factors are provided within desired limits, mottle is minimized or substantially or totally eliminated, at least to the extent that if any mottle is present, it remains unnoticed when viewed by the naked eye.

Exemplary papers suitable for use with the present invention belong to the category of “Printing and Writing Grade” papers. This category includes, but is not limited to, the subclasses of papers indicated herein. These subclasses include “Fine Papers”, “Single Ply Board” (excluding cup and milk carton boards), “Newsprint and Offset Papers”, “Coated Papers”, “Specialty Printing Papers” and the like.

In accordance with the present invention, these and other such papers may be used and printed upon by methods including, but not limited to, digital imaging, digital printing, xerography, electrophotography, reprography, lithography and the like. See, PULP AND PAPER CHEMISTRY AND CHEMICAL TECHNOLOGY, Third Edition, Vol. 1, James P. Casey, Editor, John Wiley & Sons, New York (1980). See also, G. A. Smook et al., HANDBOOK FOR PULP AND PAPER TECHNOLOGISTS, Canadian Pulp and Paper Association, Montreal, Canada (1989); U.S. Pat. No. 5,281,507 (Simms et al.); J. F. Oliver, The Role of Paper Surface Properties in Non-Impact Printing, Vol. 14, No. 5, Journal of Imaging Technology, pp. 144–148 (October 1988); H. W. Davidson, Paper Surface Printability in Connection with Molecular and Cell Structures, Vol. 105, Chemical Abstracts, p. 116 (1986); Hansuebai, A., et al., SMOOTHNESS, 66(11), Am. Ink Maker, pp. 28, 30, 32, 34–34H (1988); I. M. Kajanto, The effect of formation on print quality with wood free offset papers, Nordic Pulp and Paper Research Journal, No. 1, pp. 8–15 (1989). It is noted that certain papers are not included among the classes of papers that may be used in accordance with the present invention. These excluded classes are “Kraft”, “Tissue”, “Multiboard”, “Corrugated Medium” and “Roofing” papers, each of which is not intended for electrophotographical printing.

In embodiments of the present invention, the several factors that affect mottle formation include smoothness, formation, charge acceptance and caliper. Smoothness refers to the smoothness of the printing surface of the printing medium, e.g., paper. Smoothness may be measured by several methods known to those skilled in the art. Such methods include those established and known as TAPPI TEST METHODS. Examples include the T555 pm-94 (Roughness of paper and paperboard (Print-surf method)) and T538 om-96 (Roughness of paper and paperboard (Sheffield Method)) tests (Sheffield and Hagerty are interchangeable terms). A smoothness of less than or equal to about 110 Hagerty units is preferred, in accordance with the present invention, to minimize, eliminate or substantially reduce mottle.

The smoothness may be achieved by a proper combination of fibers making up the base papers. For example, small thin hardwood fibers are preferred. Eucalyptus provides preferred hardwood fibers. The hardwood fibers can be mixed with up to about 70% by weight of softwood fibers, based on the total weight of the final paper. Pressing of these fibers, according to methods well recognized in the art, achieves the desired densification and smoothness of less than or equal to about 110 Hagerty units. Additionally, calendaring, coating, and/or saturating these fibers may be conducted to achieve not only the prescribed smoothness, but also the desired finish (e.g., gloss, matte or dull). Further, substrates other than base papers may be used.

According to the present invention, the smoothness is less than or equal to about 110 Hagerty units, preferably from about 0 to about 110 Hagerty units, more preferably, from about 5 to about 100 Hagerty units and, most preferably, from about 15 to about 75 Hagerty units. In a number of instances, however, a smoothness from about 100 to about 110 Hagerty units may be used.

In addition to smoothness, the formation of the paper measured in terms of a formation index preferably should be greater than or equal to about 40. The formation is a variation in weight percent of the components comprising the paper over the entire volume of the paper. To achieve the desired formation index, hardwood fibers (e.g., eucalyptus fibers) may be mixed with up to 70% by weight of softwood fibers based on a total weight of the final paper. In addition, an optional filler from about 0 to about 30% by weight based on the total weight of the final paper may be used. For example, for uncoated papers, preferably, the filler comprises from about 5% to about 24% by weight and, more preferably, from about 15% to about 24% by weight. Unless indicated otherwise, all percentages are percents-by-weight based on the total weight of the final paper formed in accordance with the present invention. Examples of fillers suitable for use with the present invention include clays, calcium carbonates, titanium dioxide, talc, silicates, other pigments and mixtures thereof.

The procedure for measuring the formation of a paper in terms of the formation index (FI) is noted below. According to the procedure outlined below, the FI is at least about 40, preferably, from about 40 to about 130 and, most preferably, from about 70 to about 200.

Procedure for Quantifying FI on a Test Paper

This procedure provides an index of the formation for a sheet and provides quantitative information concerning floc size distribution and a representation of the floc distribution.

Equipment 3.1M/K Model 950R Formation/Floc Analyzer with printer and manual therefor.

With reference to FIG. 1, the M/K Systems, Inc. Microformation Tester measures the uniformity of paper on the basis of localized variations in its basis weight, i.e., on areas in the 0.15 $mm^2$-16 $mm^2$ range. As depicted in FIG. 1, the test sheet 10 is mounted on the 20 cm long, 10 cm diameter Pyrex drum 20, and it is illuminated by a lamp 30 with lens 32 mounted on its axis. The white light 40 emitted by the lamp 30 is collimated onto an area of the sheet about 5 mm in diameter. The light transmitted perpendicularly through the sheet is passed by a focusing lens 50 through a small aperture 60 outside of the drum 20 and onto a photocell 70 directly behind it.

As the drum 20 rotates at 150 rpm, the light bulb (not shown) and the aperture/photocell assembly are driven in tandem down the axis by a stepper motor (not shown) in 0.8 mm increments. Thus, an area approximately equal to 18 cm×25 cm of the sheet 10 is examined in about 200 almost contiguous scan lines.

An important feature of the instrument is the manner in which the individual measurements are handled. The readings made and stored in its memory are not measurements of the absolute optical density. Rather, they are measurements of the deviations from the mean optical density.

Prior to scanning a sheet, the drum makes 20 rotations along its right hand edge. During these 20 rotations, the light intensity is adjusted so that the average amount of light transmitted is the same for all papers, irrespective of their basis weight. This amount of transmission also always corresponds to the midweight class #32 of the basis weight histogram, placing the formation measurement of all pages on the same scale.

The primary reason for measuring formation in this manner is that it has been found that when the Formation Index is determined in this way, it correlates very well with both visual rankings of formation, and with the relative mass basis weight variations of all uncoated and lightly filled sheets, except overdensified papers such as glassine, tracing papers, release papers, etc. (Kamppa, A., Journal of Physics E, Scientific Instruments 15; p. 1119–22 (1982)). For example, it has been shown that basis weight contour maps prepared by a scanning (optical) micro-densitometer of a sheet and its beta-ray radiograph are virtually identical in every structural detail (Kallmes, O., Paper Trade Journal 154 (1971)).

Basis weight variations per se cannot be described on an absolute basis, but only on a relative one. When one considers the effect of a given basis weight variation on a light and heavy sheet. For example, a 5 gsm differential is highly significant to a 15 gsm tissue sheet, but virtually insignificant to a 440 gsm board.

Corte & Dodson (Das Papier 23 (1969) 381) have shown that on a theoretical basis for a randomly-formed sheet, the variance of the basis weight of a sheet is a function of the mean length of its fibers and their denier, the area of the sheet examined per measurement, and the basis weight of the sheet. Machine-made papers, of course, are far less uniform than randomly-formed ones, and so there are additional complications. Thus, it follows that basis weight variations are strictly comparable only within a given grade made from a given furnish. For practical purposes, however, results are comparable within narrow weight ranges, roughly ±20%.

Each measurement, i.e., each local optical density deviation from the mean is amplified, passed through an analog-to-digital converter, and stored in one of 64 optically-measured "basis weight" classes or memory bins, which differ from one another by about 1% of the grey scale. The greater the deviation in optical density from the average, the further away a given data point is stored from the central bin or average weight class (#32) of the histogram.

At the end of each scan, three parameters of the 100,000 point histogram in memory are recorded digitally. One is the number of contiguous classes containing at least 100 data points. The second one is the amplitude or peak height of the histogram, i.e., the number of data points in the class containing the most data points, usually in class #32. Finally, the instrument calculates the Formation Index which is defined to be the ratio of the peak height divided by the number of its weight classes and by 100, or $$\text{Formation Index} = \frac{\text{Peak Height}}{\text{No. of Classes}} \times \frac{1}{100}$$

The more uniform a sheet, the greater is its peak height, and the fewer the number of weight classes into which the data fall. Thus, both parameters comprising the Formation Index vary in a manner to increase or decrease it, depending on the nature of the change in uniformity of a sheet. This makes the instrument highly sensitive to small variations in formation quality.

The Formation Index is particularly sensitive to small-scale variations. As such variations are particularly sensitive to the fines-content of a sheet, it follows that the Formation Index is fines-sensitive. Thus, for example, at the start-up of a paper machine on fresh water, the FI can easily double during the first couple of hours of operation as the fines content of the white water gradually rises.

Sample Selection 4.1 For multi-ream lots test samples should be selected in such a manner that a cross section of the overall product is obtained.

4.2 From each ream tested select one (1) sheet. (Min. four (4) reams). If less than four reams, select enough sheets to obtain product evaluation.

Sample Preparation 5.1 Mark each sheet indicating ream (or sheet in a series).

Procedure

FIG. 1 depicts a schematic of the equipment used in conjunction with the procedure outlined herein.

6.1 Mount the sample 10 on drum scanner 20 using hold down tabs (not shown), making sure that one edge is in contact with the black retaining ring (not shown) of the glass drum (i.e., 20) and that sample 10 is flush against the glass surface of the drum 20.

6.2 Assure that the aperture 60 is set to the correct size (for most papers use setting "blue"; see manual noted in 3.1 above) and is properly seated in the holder (not shown) and the range is set to "1" (see manual noted in 3.1 above).

6.3 Activate the equipment (see 3.1 above) and make sure that the display (not shown) does not indicate "drum" or "lamp". If so, this indicates that the aperture opening is too small so that the drum 20 needs to be rotated. See manual referenced in 3.1 above.

6.4 Turn selector knob (not shown) until "run formation" appears on the display and then press enter twice.

6.5 After the results are printed, turn selector knob (not shown) until "start floc run" is displayed. Now insert the "red aperture" in place of the "blue aperture" and press enter. The "red aperture" is used for most papers.

6.6 Make sure range is set to "1".

6.7 When printout is complete, remove tested sample and mount new sample as disclosed in procedural step 6.1. Repeat steps 6.1 to 6.7, as necessary.

Results

Mark and separate printout sheets from printer (not shown).

To achieve the formation index of at least 40, hardwood fibers up to about 30%, softwood fibers up to about 70%, fillers up to about 30% and other additives well known in the art are mixed typically with water. Various fibers, fillers and additives are noted in the patents and publications previously cited. The mixed fibers, fillers and other additives well known to those skilled in the art pass through a fiber refining process to a proper degree of "fineness", e.g., 400, and then the fibers (fillers and other additives) are finalized by proper wet end set up and drainage conditions. These procedures are well known to those skilled in the art.

The primary intent is to provide a uniform level of turbulence on mixing the fibers, fillers, other additives and the like which allows quick setting of the fibers without localized disturbance. For this purpose, any type of "former" may be used, including, for example, twin wire gap formers (e.g., Fourdriner, Beloit Bel Baie, III), hybrid formers (i.e., short single wire section followed by a top former section as in a Valmet Synformer) and the like. Further, a Dandy roll can be used to enhance formation in a slow former machine, such as those described above. The goal is to preferably provide a paper having a weight variation of no more than from about 0.2 to about 0.1% by weight throughout the depth, width and height (i.e., volume) of each paper so formed.

In addition to smoothness and formation (i.e., formation index), the paper must have a charge acceptance and a caliper (i.e., thickness) sufficient to yield a paper substantially or totally free of mottle in a printed region thereof or wherein mottle is minimized. The charge acceptance of a paper relates to the electrical properties of the paper which in turn are affected by the moisture content thereof. Various conductivity controlling agents may be included with the fibers, fillers, other additives and the like, used by those skilled in the art of forming papers. Such conductivity controlling agents include, but are not limited to, various salts, conductive polymers and compounds containing quaternary ammonium groups. Examples of these are NaCl, $NaNO_3$, and the like. Further, the charge acceptance may be affected by ionic impurities present. Thus, such impurities in the pulp, other fibers, fillers, other additives, the water used, and the like, need to be controlled. These procedures are known to those skilled in the art.

To form the printing medium (e.g. paper) according to the present invention, the charge acceptance of the paper preferably needs to satisfy the conditions of Equation (I) and the formation index needs to satisfy Equation (II):

$$V_{calculated}=\{4.2+(9.86+0.1r_{measured})^{1/2}\}/0.05 \quad \text{(I)}$$

$$FI=0.008V_{calculated}^{2}-1.8V_{calculated}+145 \quad \text{(II)}$$

wherein $r_{measured}$ is the caliper or thickness, r, of the paper (expressed in microns), wherein $V_{calculated}$ is a minimum value of the charge acceptance, V (expressed in volts), and $V_{calculated}$ is a positive real number (expressed in volts) and wherein FI is the minimum formation index of the paper or, alternatively, satisfy Equation (III):

$$\frac{V_{MEASURED}}{r_{MEASURED}} = \frac{1950}{(FI)^2} - \frac{30}{FI} + 0.65 \quad \text{(III)}$$

wherein $V_{measured}$ is the charge acceptance in volts of the paper and $r_{measured}$ is the thickness in microns of the paper and wherein FI is the minimum formation index of the paper and FI is a positive real number.

In Equations (I) and (II), when the $V_{calculated}$ (i.e., minimum effective charge acceptance, V) is determined by Equation (I), the FI (minimum effective formation index) is determined by Equation (II).

Thus, for a given thickness, r, the minimum value of the charge acceptance, V, can be determined by solving Equation (I). This solved value of V represents the minimum charge acceptance a paper can have and remain in conformity with a paper made according to the present invention. In addition, the minimum value of FI must satisfy the condition of Equation (II) wherein FI is the formation index previously noted. The FI must be at least 40, preferably, at least 45. The minimum FI for a given paper having a thickness r and a minimum charge acceptance V (calculated from Equation (I)) is determined by solving Equation (II).

Alternatively, if Equations (I) and (II) are not satisfied, then Equation (III) must be satisfied wherein FI is a positive real number. Thus, a paper satisfying the previously recited smoothness (less than or equal to about 110 Hagerty units), formation index (at least about 40), charge acceptance and caliper (sufficient to substantially or totally eliminate mottle; alternatively, satisfy the conditions of Equations (I) and (II)) is a paper conforming to the present invention.

In Equation (III), the value of $r_{measured}$ may be a pre-set thickness or the measured thickness of a paper made in accordance with the present invention. Likewise, the value of $V_{measured}$ may be a pre-set charge acceptance or the measured charge acceptance of a paper made in accordance with the present invention.

Also, if the thickness, r, of a printing medium (e.g., paper) is less than about 98.6 microns, then the charge acceptance, V, thereof is at least about 80 volts and the formation index, FI, thereof is at least about 45 for such a printing medium (e.g., paper) to be in accordance with the present invention. Preferably, the thickness of the printing medium is from about 0.05 mm to about 0.5 mm.

The procedure for measuring the charge acceptance, V, is outlined in Section 1–4 of the instruction manual for the Monroe Electronics static charge analyzer MODEL 276A and Block Diagram, provided therewith, each of which is incorporated herein by reference in its entirety. Note that the comments therein relating to ZnO coated papers are irrelevant to the present invention. Further, static holding tendencies are measured in 50% relative humidity, 70° F. temperature at 25 microamps current for 5 seconds. Also, the section on light source calibration is irrelevant to the present invention. The light source noted therein is disconnected.

According to the present invention, the method for printing (e.g., xerographic color printing) comprises providing the paper of the present invention and depositing one or more colors thereon to yield substantially or totally mottle free prints thereon.

All test methods, descriptions thereof including TAPPI test methods and descriptions thereof, all manuals, patents and publications cited herein are incorporated by reference in their entirety into this application.

Other modifications of the present invention may occur to those skilled in the art based upon a review of the present application and these modifications, including equivalents thereof, are intended to be included within the scope of the present invention.

What is claimed is:

1. A printing medium comprising a base and having a thickness, r, a charge acceptance, V, a printing surface smoothness and a formation index, FI, wherein said thickness, r, said charge acceptance, V, said smoothness and said formation index, Fl, are sufficient to minimize mottle, when the base is coated and when the base in uncoated wherein said printing medium comprises paper.

2. The printing medium of claim 1, wherein said printing surface smoothness is less than or equal to about 110 Hagerty units and said formation index, FI, is greater than or equal to about 40, wherein said printing surface smoothness, said thickness, r, said charge acceptance, V, and said formation index, FI, are sufficient to substantially or totally eliminate said mottle.

3. The printing medium of claim 1, wherein said base is paper.

4. The printing medium of claim 1, wherein said printing medium is a printing and writing grade paper.

5. The printing medium of claim 1, wherein said V has a minimum value calculated by Equation (I):

$$V_{calculated}=\{4.2+(-9.86+0.1\ r_{measured})^{1/2}\}/0.05 \quad (I)$$

and said FI satisfies Equation (II):

$$FI=0.008V_{calculated}2-1.8V_{calculated}+145 \quad (II)$$

wherein $r_{measured}$ is said thickness, r, expressed in microns, wherein $V_{calculated}$ is said minimum value of said charge acceptance, V, expressed in volts and $V_{calculated}$ is a positive real number and wherein FI is a minimum formation index of said printing medium.

6. The printing medium of claim 5, wherein FI is at least about 45.

7. The printing medium of claim 6, wherein r is from about 0.05 mm to about 0.5 mm.

8. The printing medium of claim 7, wherein said base is a paper comprising up to about 70% by weight of at least one softwood fiber, up to about 30% by weight of at least one hardwood fiber and up to about 30% by weight of at least one filler.

9. The printing medium of claim 5, wherein said smoothness is from about 100 to about 110 Hagerty units.

10. The printing medium of claim 5, wherein said smoothness is from about 0 to about 110 Hagerty units.

11. The printing medium of claim 5, wherein said smoothness is from about 5 to about 100 Hagerty units.

12. The printing medium of claim 5, wherein said smoothness is from about 15 to about 75 Hagerty units.

13. The printing medium of claim 5, wherein FI is from about 40 to about 130.

14. The printing medium of claim 1, wherein said r is below about 98.6 microns, and said V is at least about 80 volts and said FI is at least about 40.

15. The printing medium of claim 1, wherein the base is uncoated.

16. The printing medium of claim 1, further comprising a coating on the base.

17. A printing medium comprising a substrate, wherein said printing medium comprises paper and has a thickness, r, a charge acceptance, V, a printing surface smoothness of less than or equal to about 110 Hagerty units, and a formation index, FI, of greater than or equal to about 40, wherein said V has a minimum value calculated by Equation (I):

$$V_{calculated}=\{4.2+(-9.86+0.1\ r_{measured})\}/^{1/2}\{/0.05 \quad (I)$$

and said FI satisfies Equation (II):

$$FI\ 0.008V_{calculated}{}^{2}1.8V_{calculated}+145 \quad (II)$$

wherein $r_{measured}$ is said thickness, r, expressed in microns, wherein $V_{calculated}$ is said minimum value of said charge acceptance, V, expressed in volts, and $V_{calculated}$ is a positive real number and wherein FI is a minimum formation index of said printing medium.

18. A method of printing comprising:

(a) providing a printing medium comprising a base, wherein said printing medium comprises paper and has a thickness, r, a charge acceptance, V, a printing surface smoothness and a formation index, FI, wherein said thickness, r, said charge acceptance, V, said smoothness and said formation index, FI, are sufficient to minimize mottle; and (b) depositing one or more colors onto said printing medium to form a printed region on said printing medium.

19. The method of claim 18, wherein said depositing step is a xerographic printing step.

20. A method of printing comprising:

(a) providing a printing medium comprising a base paper, wherein said printing medium has a thickness, r, a charge acceptance, V, a printing surface smoothness of less than or equal to about 110 Hagerty units, and a formation index, FI, of greater than or equal to about 40, wherein said thickness, r, and said charge acceptance, V, said printing surface smoothness and said formation index, FI, are sufficient to substantially or totally eliminate mottle; and (b) depositing one or more colors onto said printing medium.

21. The method of claim 20, wherein V has a minimum value calculated by Equation (I):

$$V_{calculated}=14.2+(-9.86+0.1\ r_{measured})^{1/2}\}/0.05 \quad (I)$$

and said FI satisfies Equation (II):

$$FI=0.008V_{calculated}^{2}-1.8V_{calculated}+145 \quad (II)$$

wherein $r_{measured}$ is said thickness, r, expressed in microns, wherein $V_{calculated}$ is said minimum value of said charge acceptance, V, expressed in volts, and $V_{calculated}$ is a positive real number and wherein FI is a minimum formation index of said printing medium.

22. A method of printing comprising:

(a) providing the printing medium of claim 1; and (b) depositing one or more colors on said printing medium.

* * * * *